US012622468B2

(12) United States Patent
Lee et al.

(10) Patent No.: US 12,622,468 B2
(45) Date of Patent: May 12, 2026

(54) AEROSOL GENERATING DEVICE AND METHOD OF UNLOCKING THE SAME

(71) Applicant: KT&G CORPORATION, Daejeon (KR)

(72) Inventors: Wonkyeong Lee, Guri-si (KR); Paul Joon Sunwoo, Seoul (KR); Min Kyu Kim, Seoul (KR); Soung Ho Ju, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 320 days.

(21) Appl. No.: 18/035,810

(22) PCT Filed: Feb. 10, 2023

(86) PCT No.: PCT/KR2023/001973
§ 371 (c)(1),
(2) Date: May 8, 2023

(87) PCT Pub. No.: WO2023/191302
PCT Pub. Date: Oct. 5, 2023

(65) Prior Publication Data
US 2024/0341363 A1 Oct. 17, 2024

(30) Foreign Application Priority Data

Mar. 30, 2022 (KR) ........................ 10-2022-0039339

(51) Int. Cl.
*A24F 40/49* (2020.01)
*A24F 40/50* (2020.01)
(Continued)

(52) U.S. Cl.
CPC .............. *A24F 40/49* (2020.01); *A24F 40/50* (2020.01); *A24F 40/65* (2020.01); *G06F 21/32* (2013.01);
(Continued)

(58) Field of Classification Search
CPC .......... A24F 40/49; A24F 40/50; A24F 40/65; A24F 40/53; A24F 40/60; G06F 21/32;
(Continued)

(56) References Cited

U.S. PATENT DOCUMENTS

2013/0284192 A1 10/2013 Peleg et al.
2016/0029697 A1 2/2016 Shafer
(Continued)

FOREIGN PATENT DOCUMENTS

CA 3 135 789 A1 10/2020
JP 2008-59382 A 3/2008
(Continued)

OTHER PUBLICATIONS

Communication dated Jul. 30, 2024 in Japanese Application No. 2023-540815.
(Continued)

*Primary Examiner* — An T Nguyen
(74) *Attorney, Agent, or Firm* — Sughrue Mion, PLLC

(57) ABSTRACT

An aerosol generating device includes a housing, a battery disposed in the housing and configured to supply power, an aerosol generator configured to receive the power from the battery and activate aerosol generation, a biometric information obtainer exposed to an outside of the housing and configured to obtain biometric information of a user, and a controller configured to perform authentication of the user based on the biometric information and activate the aerosol generator based on a result of the authentication.

12 Claims, 7 Drawing Sheets

(51) Int. Cl.

| | |
|---|---|
| *A24F 40/65* | (2020.01) |
| *G06F 21/32* | (2013.01) |
| *G06F 21/44* | (2013.01) |

(52) U.S. Cl.
CPC ...... *G06F 21/44* (2013.01); *G06F 2221/2111* (2013.01)

(58) Field of Classification Search
CPC .. G06F 21/44; G06F 2221/2111; G06F 21/31; H01M 2220/30
See application file for complete search history.

(56) References Cited

U.S. PATENT DOCUMENTS

| | | | |
|---|---|---|---|
| 2018/0213849 A1 | 8/2018 | Qiu | |
| 2020/0128877 A1 | 4/2020 | Sur et al. | |
| 2025/0164954 A1* | 5/2025 | Anderson | ........ G06K 19/06037 |

FOREIGN PATENT DOCUMENTS

| | | | |
|---|---|---|---|
| JP | 2020-195347 | A | 12/2020 |
| KR | 10-2222248 | B1 | 3/2021 |
| KR | 10-2021-0042743 | A | 4/2021 |
| KR | 10-2309201 | B1 | 10/2021 |
| KR | 10-2022-0000762 | A | 1/2022 |
| WO | 2020/227284 | A1 | 11/2020 |
| WO | 2021/101673 | A1 | 5/2021 |
| WO | 2021/122693 | A1 | 6/2021 |
| WO | 2021/224352 | A1 | 11/2021 |
| WO | 2021/228678 | A1 | 11/2021 |

OTHER PUBLICATIONS

Office Action issued Jan. 21, 2025 in Japanese Application No. 2023-540815.
International Search Report issued Jul. 7, 2023 in Application No. PCT/KR2023/001973.
Written Opinion of the International Searching Authority issued Jul. 7, 2023 in Application No. PCT/KR2023/001973.
Extended European Search Report dated Feb. 9, 2026 in European Application No. 23723400.0.

* cited by examiner

[Fig. 1]
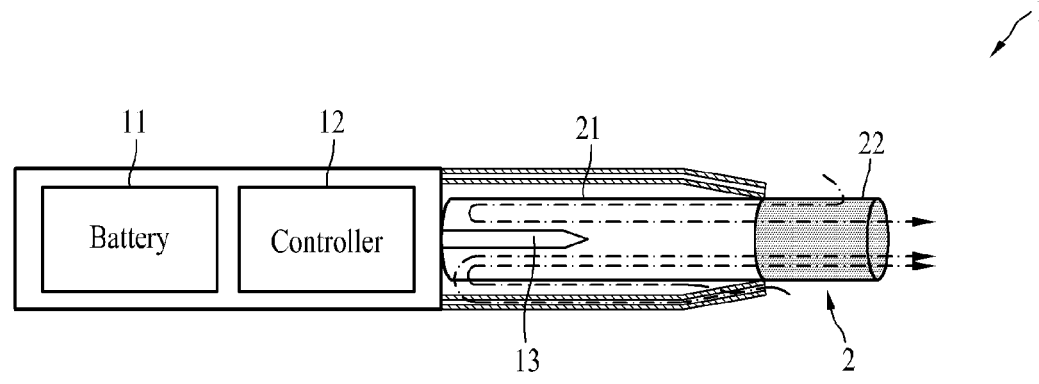
[Fig. 2]
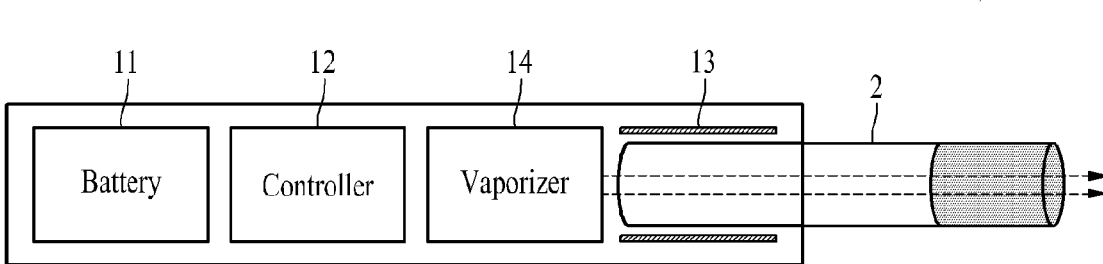
[Fig. 3]
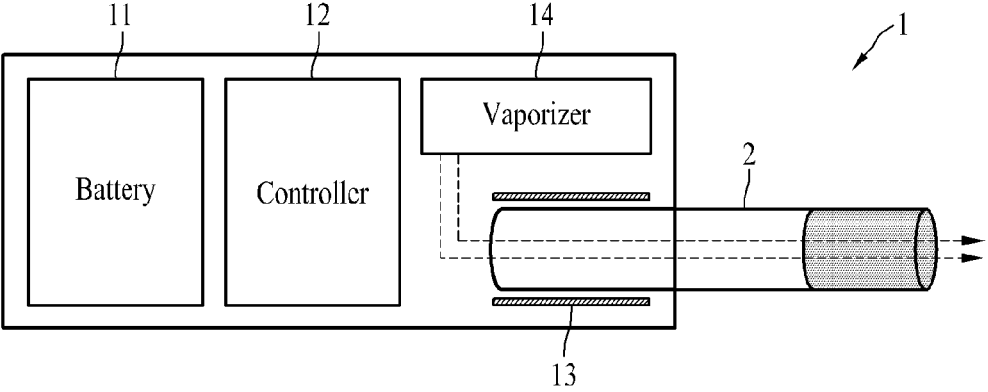

[Fig. 4]
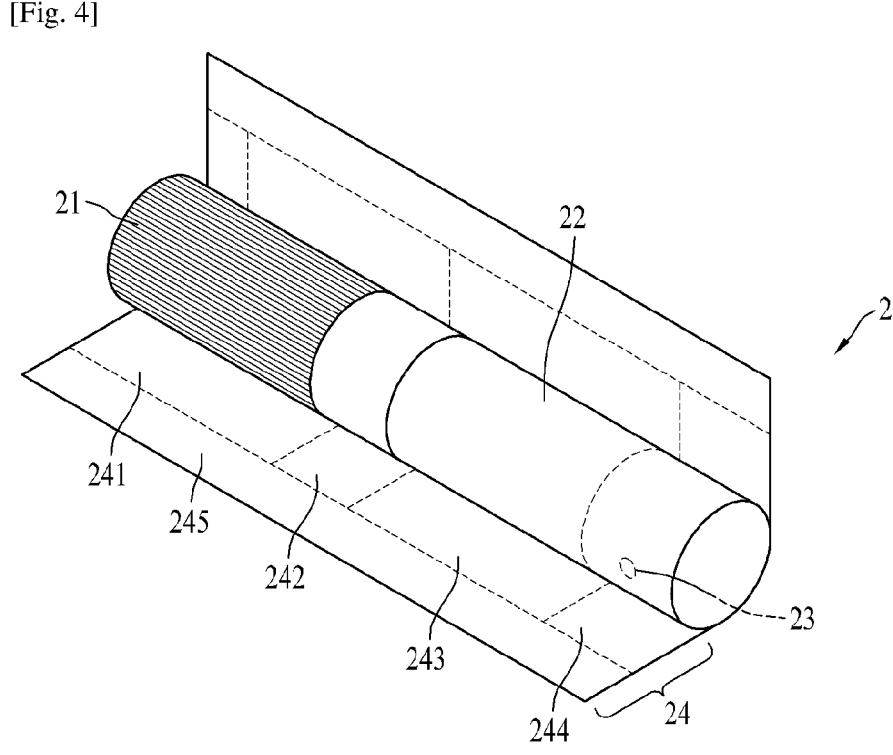
[Fig. 5]

[Fig. 6]
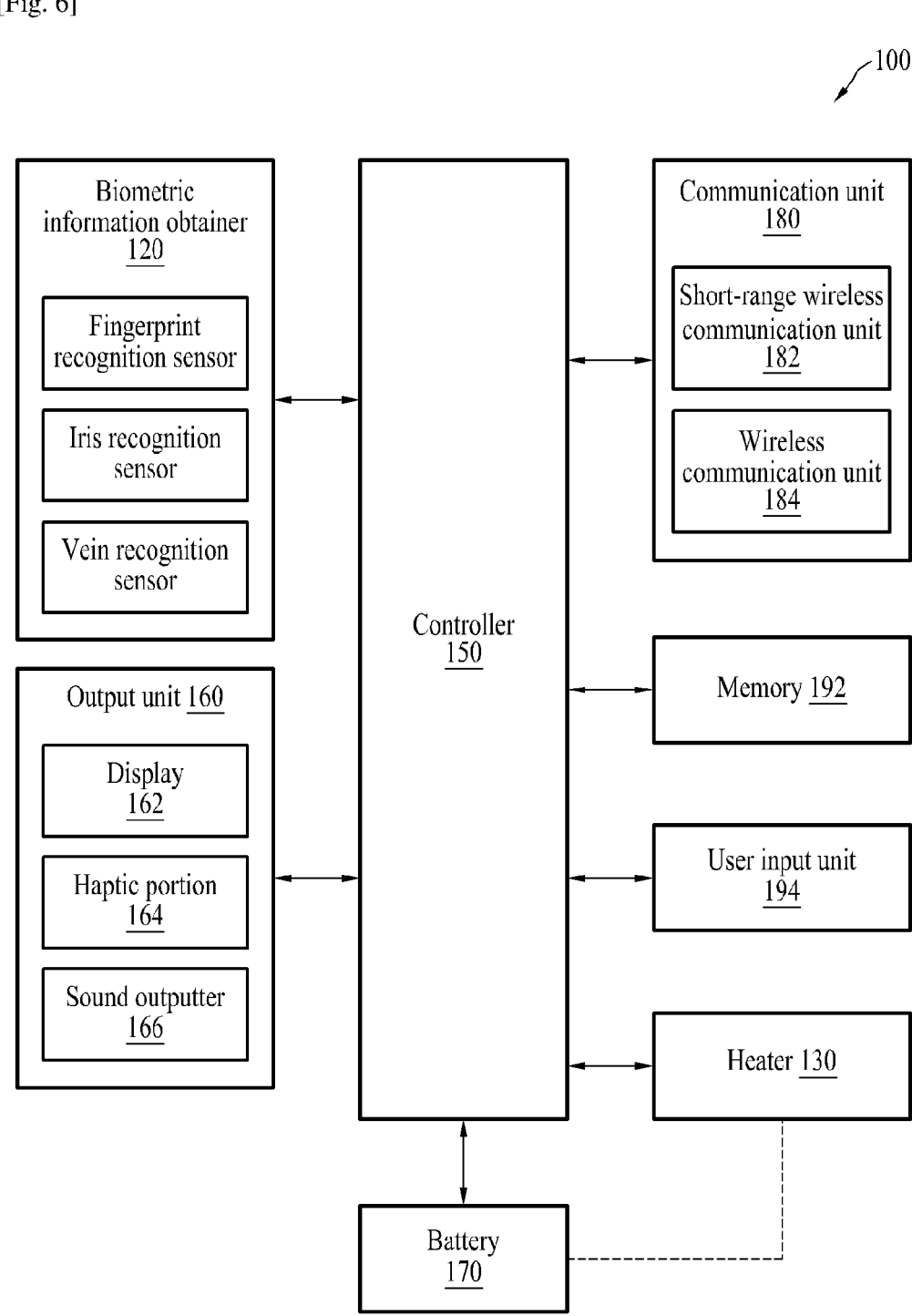

[Fig. 7]
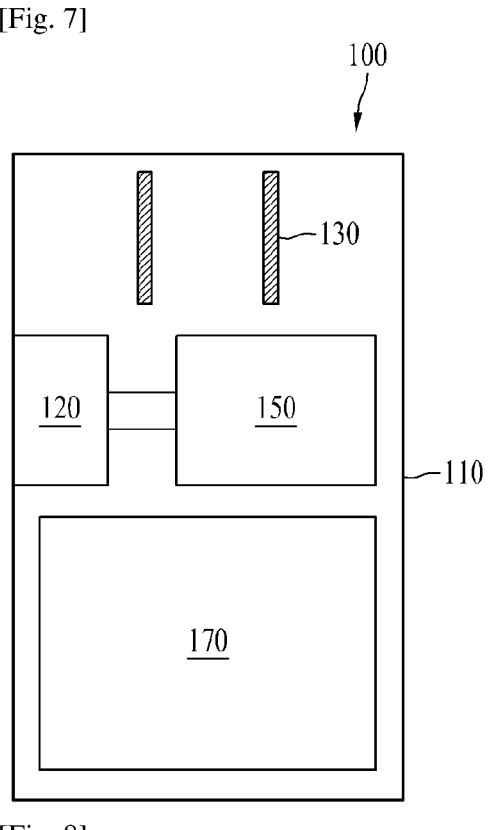
[Fig. 8]
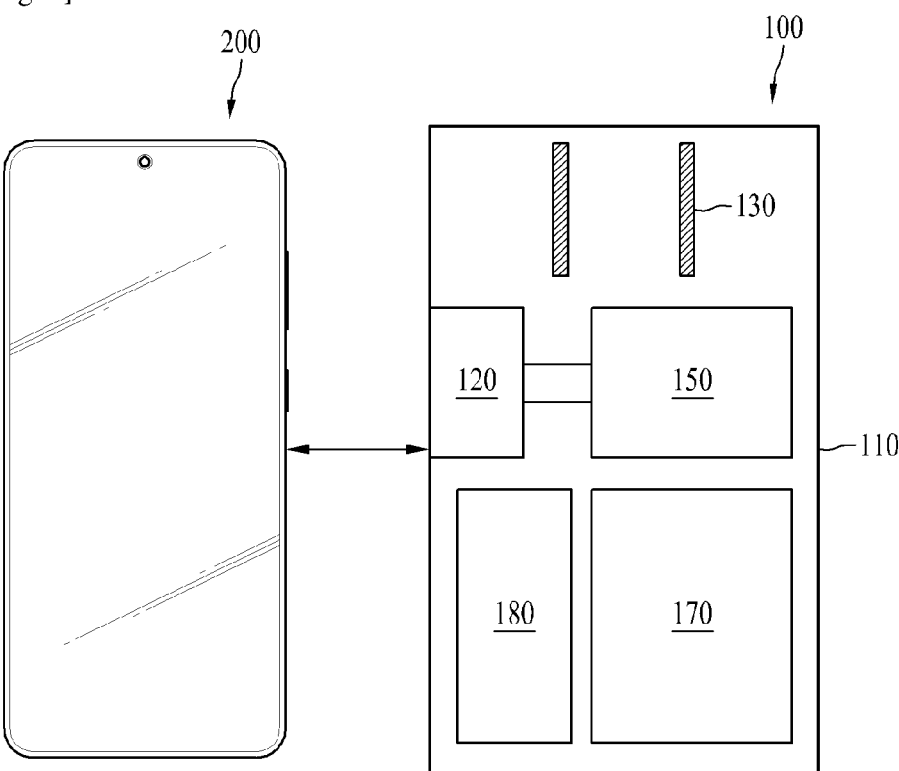

[Fig. 9]
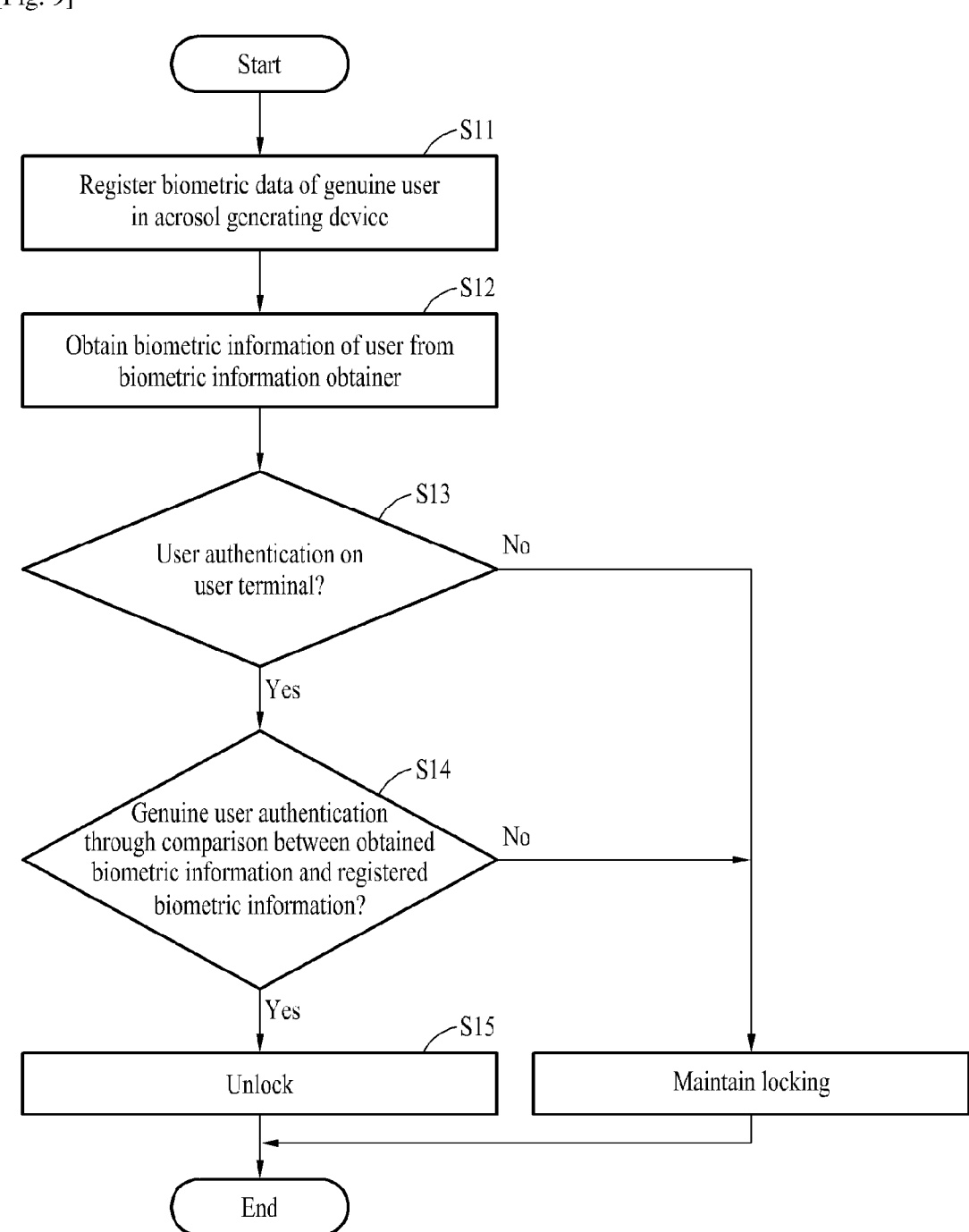

[Fig. 10]
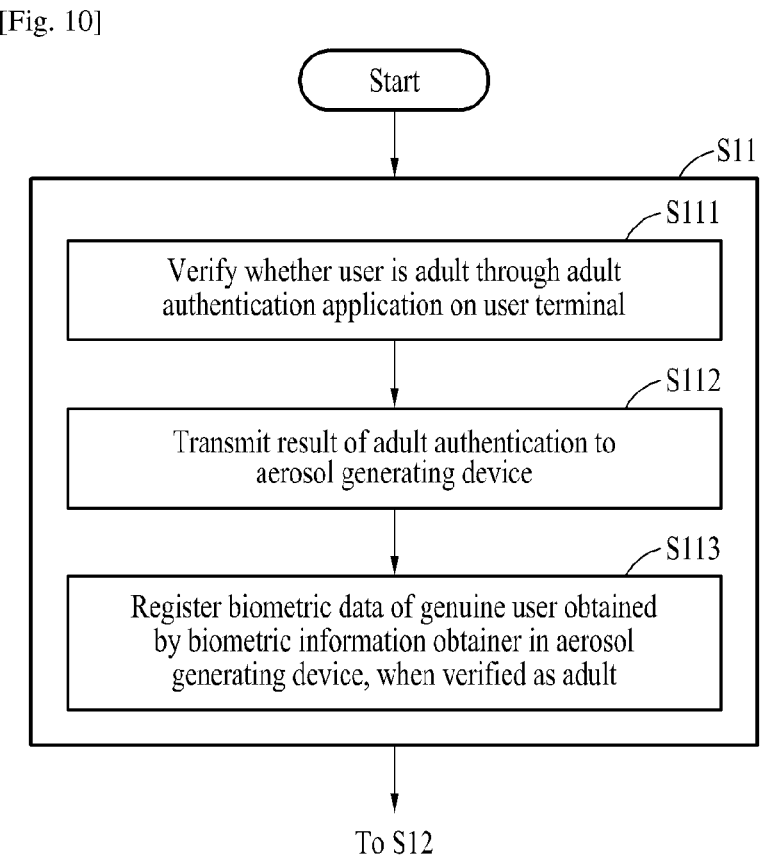

[Fig. 11]

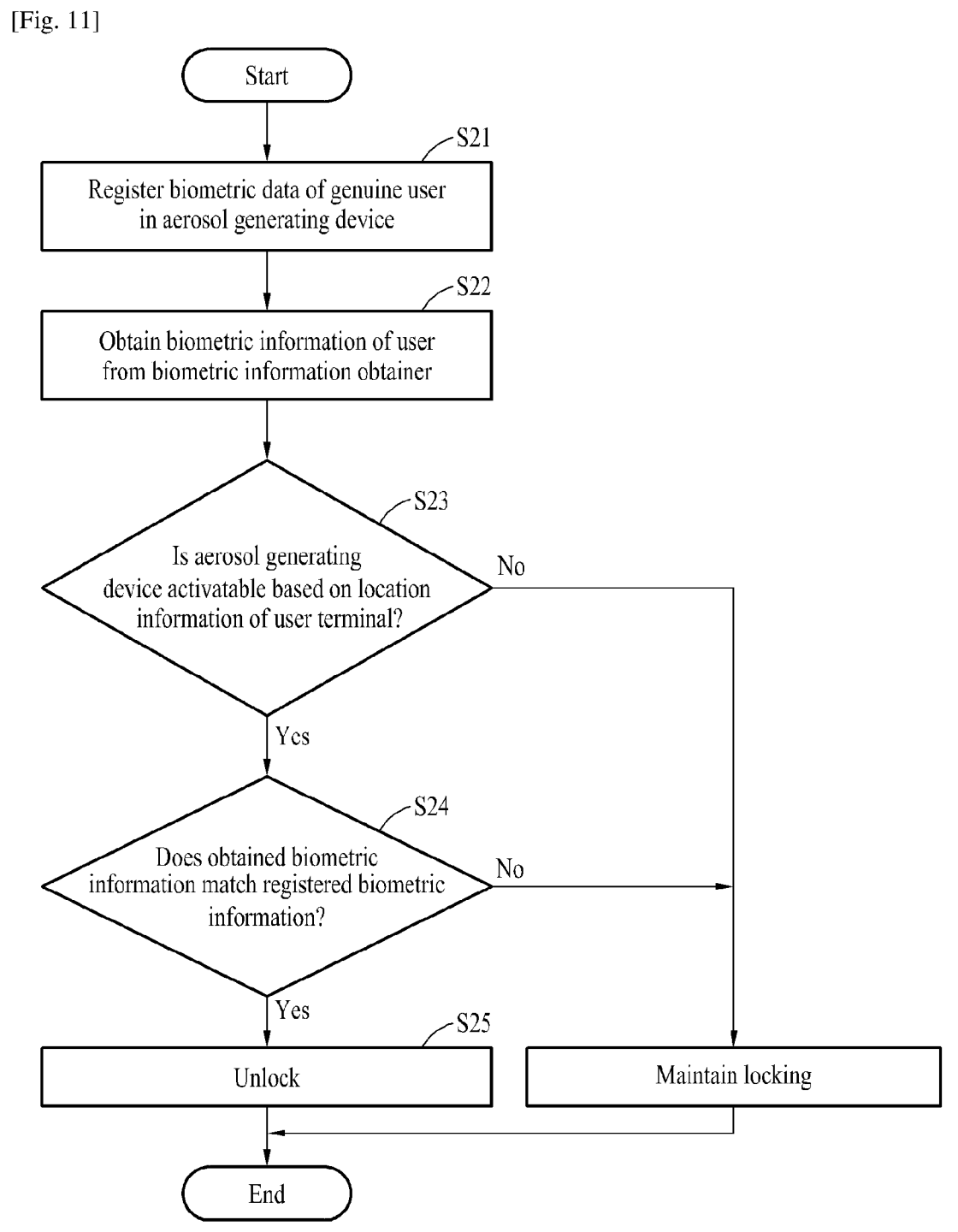

```
                    ┌──────────┐
                    │  Start   │
                    └────┬─────┘
                         │              ┌─S21
                         ▼
           ┌─────────────────────────────────┐
           │  Register biometric data of      │
           │  genuine user                    │
           │  in aerosol generating device    │
           └───────────────┬─────────────────┘
                           │             ┌─S22
                           ▼
           ┌─────────────────────────────────┐
           │  Obtain biometric information    │
           │  of user                         │
           │  from biometric information      │
           │  obtainer                        │
           └───────────────┬─────────────────┘
                           │
                           ▼          ┌─S23
                      ◇────────────◇
                     ╱   Is aerosol  ╲
                    ◇  generating     ◇────── No ──┐
                    ╲ device activatable╱          │
                     ◇ based on location◇          │
                      ╲ information of  ╱           │
                       ◇user terminal?◇            │
                          │ Yes                     │
                          ▼          ┌─S24          │
                      ◇────────────◇               │
                     ╱    Does       ╲              │
                    ◇  obtained       ◇──── No ─────┤
                    ╲ biometric info   ╱            │
                     ◇ match registered◇            │
                      ╲  biometric    ╱             │
                       ◇information? ◇              │
                          │ Yes                     │
                          ▼      ┌─S25              ▼
           ┌─────────────────┐      ┌──────────────────┐
           │     Unlock      │      │ Maintain locking │
           └────────┬────────┘      └────────┬─────────┘
                    │◄───────────────────────┘
                    ▼
              ┌──────────┐
              │   End    │
              └──────────┘
```

AEROSOL GENERATING DEVICE AND METHOD OF UNLOCKING THE SAME

CROSS REFERENCE TO RELATED APPLICATIONS

This application is a National Stage of International Application No. PCT/KR2023/001973 filed Feb. 10, 2023, claiming priority based on Korean Patent Application No. 10-2022-0039339 filed Mar. 30, 2022.

TECHNICAL FIELD

The following embodiments relate to an aerosol generating device.

BACKGROUND ART

With an increasing demand for aerosol generating devices, functions related to aerosol generating devices are continuously being developed. For example, an aerosol delivery device and a system for evaluation of personal health condition are disclosed in Korean Patent Publication No. 10-2309201.

DISCLOSURE OF INVENTION

Technical Problem

An aerosol generating device according to an embodiment may be activated only by an authenticated genuine user.

An aerosol generating device according to an embodiment may guarantee the use by a genuine user through two-phase authentication.

An aerosol generating device according to an embodiment may additionally verify whether a user is in a smoking area where the aerosol generating device is allowed to use based on current location information of the user.

Solution to Problem

According to an embodiment, an aerosol generating device includes a housing, a battery disposed in the housing and configured to supply power, an aerosol generator configured to receive the power from the battery and activate aerosol generation, a biometric information obtainer exposed to an outside of the housing and configured to obtain biometric information of a user, and a controller configured to perform authentication of the user based on the biometric information and activate the aerosol generator based on a result of the authentication.

In an embodiment, the aerosol generating device may further include a communication unit configured to enable a communication with a user terminal, wherein the controller may be configured to perform a primary authentication phase of determining whether the user is a genuine user by the user terminal and a secondary authentication phase of determining whether the user is a genuine user through the biometric information.

In the primary authentication phase, adult verification of the user may be performed through an authorized adult authentication application on the user terminal.

In the primary authentication phase, user authentication may be performed based on biometric information of the user obtained by the user terminal.

In an embodiment, the aerosol generating device may further include a communication unit configured to enable interoperation between the controller and a user terminal, wherein the controller may be configured to perform a primary authentication phase of determining whether the aerosol generator is activatable based on location information of the user terminal and a secondary authentication phase of determining whether the user is a genuine user through the biometric information.

The controller may be configured to perform the primary authentication phase by determining whether the user is in a smoking area based on the location information of the user terminal.

The controller may be configured to provide information on smoking areas around the user based on the location information of the user terminal.

In an embodiment, the biometric information obtainer may include at least one of a fingerprint recognition sensor, an iris recognition sensor, a vein recognition sensor, and a lip pattern recognition sensor.

According to an embodiment, a method of unlocking an aerosol generating device includes registering biometric information data of a genuine user in the aerosol generating device, obtaining biometric information of a user through a biometric information obtainer provided in the aerosol generating device, determining whether the user is the genuine user based on the obtained biometric information, and unlocking the aerosol generating device when the user is determined to be the genuine user.

In an embodiment, the registering of the biometric information data of the genuine user in the aerosol generating device may include verifying whether the genuine user is an adult through an adult verification application on a user terminal, transmitting a result of the verifying to the aerosol generating device, and registering the biometric information data of the genuine user in the aerosol generating device obtained by the biometric information obtainer, when the genuine user is verified to be an adult.

In an embodiment, the determining may include a primary authentication phase of determining whether the user is the genuine user by a user terminal, and a secondary authentication phase of determining whether the user is the genuine user through a comparison between the obtained biometric information and the registered biometric information.

In an embodiment, the determining may include a primary authentication phase of determining whether the aerosol generating device is activatable based on location information of a user terminal, and a secondary authentication phase of determining whether the user is the genuine user through a comparison between the obtained biometric information and the registered biometric information.

In an embodiment, the biometric information may include at least one of a fingerprint, an iris, a vein, or a lip pattern of the user.

Advantageous Effects of Invention

According to embodiments, only an authenticated genuine user may be allowed to use an aerosol generating device.

According to embodiments, the use by a genuine user may be guaranteed through an authentication procedure of at least two phases.

According to embodiments, whether a user is in a smoking area where an aerosol generating device is allowed to use may be additionally verified based on current location information of the user.

According to embodiments, information on a nearby smoking area where an aerosol generating device is activatable may be provided based on a current location of a user.

BRIEF DESCRIPTION OF DRAWINGS

The foregoing and other aspects, features, and advantages of embodiments in the disclosure will become apparent from the following detailed description with reference to the accompanying drawings.

FIGS. 1 to 3 are diagrams illustrating examples of a cigarette inserted into an aerosol generating device according to an embodiment.

FIGS. 4 and 5 are perspective views of examples of a cigarette according to an embodiment.

FIG. 6 is a block diagram of an aerosol generating device according to an embodiment.

FIGS. 7 and 8 are schematic diagrams of an aerosol generating device according to an embodiment.

FIG. 9 is a flowchart illustrating a method of unlocking an aerosol generating device based on user authentication in a user terminal according to an embodiment, and FIG. 10 is a flowchart illustrating operation S11 of FIG. 9.

FIG. 11 is a flowchart illustrating a method of unlocking an aerosol generating device based on location information from a user terminal according to an embodiment.

MODE FOR THE INVENTION

The terms used in the embodiments are selected from among common terms that are currently widely used, in consideration of their function in the embodiments. However, the terms may become different according to an intention of one of ordinary skill in the art, a precedent, or the advent of new technology. Also, in particular cases, the terms are discretionally selected by the applicant of the disclosure, and the meaning of those terms will be described in detail in the corresponding part of the detailed description. Therefore, the terms used in the disclosure are not merely designations of the terms, but the terms are defined based on the meaning of the terms and content throughout the disclosure.

It will be understood that when a certain part "includes" a certain component, the part does not exclude another component but may further include another component, unless the context clearly dictates otherwise. Also, terms such as "unit," "module," etc., as used in the specification may refer to a part for processing at least one function or operation and may be implemented as hardware, software, or a combination of hardware and software.

As used herein, an expression such as "at least one of" that precedes listed components modifies not each of the listed components but all the components. For example, the expression "at least one of a, b, or c" should be construed as including a, b, c, a and b, a and c, b and c, or a, b, and c.

FIGS. 1 to 3 are diagrams illustrating examples of a cigarette being inserted into an aerosol generating device.

Referring to FIG. 1, an aerosol generating device 1 may include a battery 11, a controller 12, and a heater 13. Referring to FIGS. 2 and 3, the aerosol generating device 1 may further include a vaporizer 14. A cigarette 2 may be inserted into an inner space of the aerosol generating device 1.

The aerosol generating device 1 shown in FIGS. 1 to 3 may include components related to an embodiment described herein. Therefore, it is to be understood by one of ordinary skill in the art to which the disclosure pertains that the aerosol generating device 1 may further include other general-purpose components in addition to the ones shown in FIGS. 1 to 3.

In addition, although it is shown that the heater 13 is included in the aerosol generating device 1 in FIGS. 2 and 3, the heater 13 may be omitted as needed.

FIG. 1 illustrates a linear alignment of the battery 11, the controller 12, and the heater 13. FIG. 2 illustrates a linear alignment of the battery 11, the controller 12, the vaporizer 14, and the heater 13. FIG. 3 illustrates a parallel alignment of the vaporizer 14 and the heater 13. However, the internal structure of the aerosol generating device 1 is not limited to what is shown in FIGS. 1 to 3. That is, the alignments of the battery 11, the controller 12, the heater 13, and the vaporizer 14 may be changed depending on the design of the aerosol generating device 1.

When the cigarette 2 is inserted into the aerosol generating device 1, the aerosol generating device 1 may operate the heater 13 and/or the vaporizer 14 to generate an aerosol. The aerosol generated by the heater 13 and/or the vaporizer 14 may pass through the cigarette 2 into the user.

Even when the cigarette 2 is not inserted in the aerosol generating device 1, the aerosol generating device 1 may heat the heater 13, as needed.

The battery 11 may supply power to be used to operate the aerosol generating device 1. For example, the battery 11 may supply power to heat the heater 13 or the vaporizer 14, and may supply power required for the controller 12 to operate. In addition, the battery 11 may supply power required to operate a display, a sensor, a motor, or the like installed in the aerosol generating device 1.

The controller 12 may control the overall operation of the aerosol generating device 1. Specifically, the controller 12 may control respective operations of other components included in the aerosol generating device 1, in addition to the battery 11, the heater 13, and the vaporizer 14. In addition, the controller 12 may verify a state of each of the components of the aerosol generating device 1 to determine whether the aerosol generating device 1 is in an operable state.

The controller 12 may include at least one processor. The at least one processor may be implemented as an array of a plurality of logic gates, or may be implemented as a combination of a general-purpose microprocessor and a memory in which a program executable by the microprocessor is stored. In addition, it is to be understood by one of ordinary skill in the art to which the disclosure pertains that the at least one processor may be implemented in other types of hardware.

The heater 13 may be heated by power supplied by the battery 11. For example, when a cigarette is inserted in the aerosol generating device 1, the heater 13 may be disposed outside the cigarette. The heated heater 13 may thus raise the temperature of an aerosol generating material in the cigarette.

For example, the heater 13 may be an electrically resistive heater. In this example, the heater 13 may include an electrically conductive track, and the heater 13 may be heated as a current flows through the electrically conductive track. However, the heater 13 is not limited to the foregoing example, and any example of heating the heater 13 up to a desired temperature may be applicable without limitation. Here, the desired temperature may be preset in the aerosol generating device 1 or may be set by the user.

As another example, the heater 13 may be an induction heater. Specifically, the heater 13 may include an electrically conductive coil for heating the cigarette in an induction heating manner, and the cigarette may include a susceptor to be heated by the induction heater.

For example, the heater 13 may include a tubular heating element, a plate-shaped heating element, a needle-shaped heating element, or a rod-shaped heating element, and may heat the inside or outside of the cigarette 2 according to the shape of a heating element.

In addition, the heater 13 may be provided as a plurality of heaters in the aerosol generating device 1. In this case, the plurality of heaters 13 may be disposed to be inserted into the cigarette 2, or may be disposed outside the cigarette 2. In addition, some of the heaters 13 may be disposed to be inserted into the cigarette 2, and the rest may be disposed outside the cigarette 2. However, the shape of the heater 13 is not limited to what is shown in FIGS. 1 through 3 but may be provided in various shapes.

The vaporizer 14 may heat a liquid composition to generate an aerosol, and the generated aerosol may pass through the cigarette 2 into the user. That is, the aerosol generated by the vaporizer 14 may travel along an airflow path of the aerosol generating device 1, and the airflow path may be configured such that the aerosol generated by the vaporizer 14 may pass through the cigarette into the user.

For example, the vaporizer 14 may include a liquid storage, a liquid transfer means, and a heating element. However, embodiments are not limited thereto. For example, the liquid storage, the liquid transfer means, and the heating element may be included as independent modules in the aerosol generating device 1.

The liquid storage may store the liquid composition. The liquid composition may be, for example, a liquid including a tobacco-containing material that includes a volatile tobacco flavor component, or may be a liquid including a non-tobacco material. The liquid storage may be manufactured to be detachable and attachable from and to the vaporizer 14, or may be manufactured in an integral form with the vaporizer 14.

The liquid composition may include, for example, water, a solvent, ethanol, a plant extract, a fragrance, a flavoring agent, or a vitamin mixture. The fragrance may include, for example, menthol, peppermint, spearmint oil, various fruit flavors, and the like. However, embodiments are not limited thereto. The flavoring agent may include ingredients that provide the user with a variety of flavors or scents. The vitamin mixture may be a mixture of at least one of vitamin A, vitamin B, vitamin C, or vitamin E. However, embodiments are not limited thereto. The liquid composition may also include an aerosol former such as glycerin and propylene glycol.

The liquid transfer means may transfer the liquid composition in the liquid storage to the heating element. The liquid transfer means may be, for example, a wick such as cotton fiber, ceramic fiber, glass fiber, or porous ceramic. However, embodiments are not limited thereto.

The heating element may be an element for heating the liquid composition transferred by the liquid transfer means. The heating element may be, for example, a metal heating wire, a metal heating plate, a ceramic heater, or the like. However, embodiments are not limited thereto. In addition, the heating element may include a conductive filament such as a nichrome wire, and may be arranged in a structure wound around the liquid transfer means. The heating element may be heated as a current is supplied and may transfer heat to the liquid composition in contact with the heating element, and may thereby heat the liquid composition. As a result, an aerosol may be generated.

For example, the vaporizer 14 may also be referred to as a cartomizer or an atomizer. However, embodiments are not limited thereto.

Meanwhile, the aerosol generating device 1 may further include general-purpose components in addition to the battery 11, the controller 12, the heater 13, and the vaporizer 14. For example, the aerosol generating device 1 may include a display that outputs visual information and/or a motor that outputs tactile information. In addition, the aerosol generating device 1 may include at least one sensor (e.g., a puff sensor, a temperature sensor, a cigarette insertion detection sensor, etc.). In addition, the aerosol generating device 1 may be manufactured to have a structure in which external air may be introduced or internal gas may flow out even with the cigarette 2 being inserted.

Although not shown in FIGS. 1 to 3, the aerosol generating device 1 may constitute a system along with a separate cradle. For example, the cradle may be used to charge the battery 11 of the aerosol generating device 1. Alternatively, the cradle may be used to heat the heater 13, with the cradle and the aerosol generating device 1 coupled.

The cigarette 2 may be of a similar type to a general burning type. For example, the cigarette 2 may be divided into a first portion including an aerosol generating material and a second portion including a filter or the like. Alternatively, the second portion of the cigarette 2 may also include the aerosol generating material. For example, the aerosol generating material provided in the form of granules or capsules may be inserted into the second portion.

The first portion may be entirely inserted into the aerosol generating device 1, and the second portion may be exposed outside. Alternatively, only the first portion may be partially inserted into the aerosol generating device 1, or the first portion may be entirely into the aerosol generating device 1 and the second portion may be partially inserted into the aerosol generating device 1. The user may inhale the aerosol with the second portion in their mouth. In this case, the aerosol may be generated as external air passes through the first portion, and the generated aerosol may pass through the second portion into the mouth of the user.

For example, the external air may be introduced through at least one air path formed in the aerosol generating device 1. In this example, the opening or closing and/or the size of the air path formed in the aerosol generating device 1 may be adjusted by the user. Accordingly, an amount of atomization, a sense of smoking, or the like may be adjusted by the user. As another example, the external air may be introduced into the inside of the cigarette 2 through at least one hole formed on a surface of the cigarette 2.

Hereinafter, examples of the cigarette 2 will be described with reference to FIGS. 4 and 5.

FIGS. 4 and 5 are perspective views of examples of a cigarette according to an embodiment.

Referring to FIG. 4, the cigarette 2 may include a tobacco rod 21 and a filter rod 22. The first portion and the second portion described above with reference to FIGS. 1 to 3 may include the tobacco rod 21 and the filter rod 22, respectively.

Although the filter rod 22 is illustrated as having a single segment in FIG. 4, examples of which are not limited thereto. That is, the filter rod 22 may include a plurality of segments. For example, the filter rod 22 may include a segment that cools an aerosol and a segment that filters out certain components contained in an aerosol. In addition, the filter rod 22 may further include at least one segment that performs another function, as needed.

The diameter of the cigarette 2 may be in a range of 5 millimeters (mm) to 9 mm, and the length thereof may be about 48 mm. However, embodiments are not limited thereto. For example, the length of the tobacco rod 21 may be about 12 mm, the length of a first segment of the filter rod 22 may be about 10 mm, the length of a second segment of the filter rod 22 may be about 14 mm, and the length of a third segment of the filter rod 22 may be about 12 mm. However, embodiments are not limited thereto.

The cigarette 2 may be wrapped with at least one wrapper 24. The wrapper 24 may have at least one hole through which external air is introduced or internal gas is discharged outside. For example, the cigarette 2 may be wrapped with one wrapper 24. As another example, the cigarette 2 may be wrapped with two or more wrappers 24 in an overlapping manner. For example, the tobacco rod 21 may be wrapped with a first wrapper 241, and the filter rod 22 may be wrapped with wrappers 242, 243, and 244. In addition, the cigarette 2 may be entirely wrapped again with a single wrapper 245. For example, when the filter rod 22 includes a plurality of segments, the plurality of segments may be wrapped with the wrappers 242, 243, and 244, respectively.

The first wrapper 241 and the second wrapper 242 may be formed of general filter wrapping paper. For example, the first wrapper 241 and the second wrapper 242 may be porous wrapping paper or non-porous wrapping paper. In addition, the first wrapper 241 and the second wrapper 242 may be formed of oilproof paper and/or an aluminum laminated wrapping material.

The third wrapper 243 may be formed of hard wrapping paper. For example, the basis weight of the third wrapper 243 may be in a range of 88 grams per square meter (g/m$^2$) to 96 g/m$^2$, and may be desirably in a range of 90 g/m$^2$ to 94 g/m$^2$. In addition, the thickness of the third wrapper 243 may be in a range of 120 micrometers (μm) to 130 μm, and desirably, may be 125 μm.

The fourth wrapper 244 may be formed of oilproof hard wrapping paper. For example, the basis weight of the fourth wrapper 244 may be in a range of 88 g/m$^2$ to 96 g/m$^2$, and may be desirably in a range of 90 g/m$^2$ to 94 g/m$^2$. In addition, the thickness of the fourth wrapper 244 may be in a range of 120 μm to 130 μm, and desirably, may be 125 μm.

The fifth wrapper 245 may be formed of sterile paper (e.g., MFW). Here, the sterile paper (MFW) may refer to paper specially prepared such that it has enhanced tensile strength, water resistance, smoothness, or the like, compared to general paper. For example, the basis weight of the fifth wrapper 245 may be in a range of 57 g/m$^2$ to 63 g/m$^2$, and may be desirably about 60 g/m$^2$. In addition, the thickness of the fifth wrapper 245 may be in a range of 64 μm to 70 μm, and desirably, may be 67 μm.

The fifth wrapper 245 may have a predetermined material internally added thereto. The material may be, for example, silicon. However, embodiments are not limited thereto. Silicon may have properties, such as, for example, heat resistance which is characterized by less change by temperature, oxidation resistance which refers to resistance to oxidation, resistance to various chemicals, water repellency against water, or electrical insulation. However, silicon may not necessarily be used, and any material having such properties described above may be applied to (or used to coat) the fifth wrapper 245 without limitation.

The fifth wrapper 245 may prevent the cigarette 2 from burning. For example, there may be a probability that the cigarette 2 burns when the tobacco rod 21 is heated by the heater 13. For example, when the temperature rises above an ignition point of any one of materials included in the tobacco rod 21, the cigarette 2 may burn. Even in this case, it may still be possible to prevent the cigarette 2 from burning because the fifth wrapper 245 includes a non-combustible material.

In addition, the fifth wrapper 245 may prevent a holder from being contaminated by substances produced in the cigarette 2. For example, liquid substances may be produced in the cigarette 2 by puffs from the user. For example, as an aerosol generated in the cigarette 2 is cooled by external air, such liquid substances (e.g., water, etc.) may be produced. Thus, wrapping the cigarette 2 with the fifth wrapper 245 may prevent the liquid substances produced in the cigarette 2 from leaking out of the cigarette 2.

The tobacco rod 21 may include an aerosol generating material. The aerosol generating material may include, for example, at least one of glycerin, propylene glycol, ethylene glycol, dipropylene glycol, diethylene glycol, triethylene glycol, tetraethylene glycol, or oleyl alcohol. However, embodiments are not limited thereto. The tobacco rod 21 may also include other additives, such as, for example, a flavoring agent, a wetting agent, and/or an organic acid. In addition, the tobacco rod 21 may include a flavoring liquid such as menthol or a moisturizing agent that is added as being sprayed onto the tobacco rod 21.

The tobacco rod 21 may be manufactured in various forms. For example, the tobacco rod 21 may be manufactured as a sheet or as a strand. The tobacco rod 21 may also be formed with a cut tobacco filler from finely cut tobacco sheets. In addition, the tobacco rod 21 may be enveloped by a heat-conductive material. The heat-conductive material may be, for example, a metal foil such as an aluminum foil. However, embodiments are not limited thereto. For example, the heat-conductive material enveloping the tobacco rod 21 may evenly distribute the heat transferred to the tobacco rod 21 to improve the thermal conductivity to be applied to the tobacco rod 21, thereby improving the taste of tobacco. In addition, the thermally conductive material enveloping the tobacco rod 21 may function as a susceptor heated by an induction heater. In this case, although not shown, the tobacco rod 21 may further include an additional susceptor in addition to the thermally conductive material enveloping the outside thereof.

The filter rod 22 may be a cellulose acetate filter. However, there is no limit to the shape of the filter rod 22. For example, the filter rod 22 may be a cylindrical rod, or a tubular rod including a hollow therein. The filter rod 22 may also be a recess-type rod. For example, when the filter rod 22 includes a plurality of segments, at least one of the segments may be manufactured in a different shape.

In this example, a first segment of the filter rod 22 may be a cellulose acetate filter. For example, the first segment may be a tubular structure including a hollow therein. In this example, the first segment may prevent internal materials of the tobacco rod 21 from being pushed back when the heater 13 is inserted and generate an aerosol cooling effect. A desirable diameter of the hollow included in the first segment may be adopted from a range of 2 mm to 4.5 mm. However, embodiments are not limited thereto.

A desirable length of the first segment may be adopted from a range of 4 mm to 30 mm. However, embodiments are not limited thereto. The length of the first segment may be desirably about 10 mm. However, embodiments are not limited thereto.

The first segment may have a hardness that is adjustable through an adjustment of the content of a plasticizer in a process of manufacturing the first segment. In addition, the first segment may be manufactured by inserting a structure such as a film or a tube of the same or different materials inside (e.g., the hollow).

A second segment of the filter rod 22 may cool an aerosol generated as the heater 13 heats the tobacco rod 21. The user may thus inhale the aerosol cooled down to a suitable temperature.

The length or diameter of the second segment may be determined in various ways according to the shape of the cigarette 2. For example, a desirable length of the second segment may be adopted from a range of 7 mm to 20 mm. The length of the second segment may be desirably about 14 mm. However, embodiments are not limited thereto.

In this case, a flavoring liquid may be applied to fiber formed of a polymer. In this case, a flavoring liquid may be applied to fiber formed of a polymer. Alternatively, the second segment may be manufactured by weaving a separate fiber to which a flavoring liquid is applied and the fiber formed of the polymer together. Alternatively, the second segment may be formed with a crimped polymer sheet.

For example, the polymer may be prepared with a material selected from the group consisting of polyethylene (PE), polypropylene (PP), polyvinyl chloride (PVC), polyethylene terephthalate (PET), polylactic acid (PLA), cellulose acetate (CA,) and aluminum foil.

As the second segment is formed with the woven polymer fiber or the crimped polymer sheet, the second segment may include a single channel or a plurality of channels extending in a longitudinal direction. A channel used herein may refer to a path through which a gas (e.g., air or aerosol) passes.

For example, the second segment formed with the crimped polymer sheet may be formed of a material having a thickness between about 5 μm and about 300 μm, for example, between about 10 μm and about 250 μm. In addition, a total surface area of the second segment may be between about 300 mm2/mm and about 1000 mm2/mm. Further, an aerosol cooling element may be formed from a material having a specific surface area between about 10 mm2/mg and about 100 mm2/mg.

The second segment may include a thread containing a volatile flavor ingredient. The volatile flavor ingredient may be menthol. However, embodiments are not limited thereto. For example, the thread may be filled with a sufficient amount of menthol to provide at least 1.5 milligrams (mg) of menthol to the second segment.

A third segment of the filter rod 22 may be a cellulose acetate filter. A desirable length of the third segment may be adopted from a range of 4 mm to 20 mm. For example, the length of the third segment may be about 12 mm. However, embodiments are not limited thereto.

The third segment may be manufactured such that a flavor is generated by spraying a flavoring liquid onto the third segment in a process of manufacturing the third segment. Alternatively, a separate fiber to which the flavoring liquid is applied may be inserted into the third segment. An aerosol generated in the tobacco rod 21 may be cooled as it passes through the second segment of the filter rod 22, and the cooled aerosol may pass through the third segment into the user. Accordingly, when a flavoring element is added to the third segment, the durability of the flavor to be carried to the user may be enhanced.

In addition, the filter rod 22 may include at least one capsule 23. The capsule 23 may perform a function of generating a flavor, or a function of generating an aerosol. For example, the capsule 23 may be of a structure in which a liquid containing a fragrance is wrapped with a film. The capsule 23 may have a spherical or cylindrical shape. However, embodiments are not limited thereto.

Referring to FIG. 5, a cigarette 3 may further include a front end plug 33. The front end plug 33 may be disposed on one side of a tobacco rod 31 opposite to a filter rod 32. The front end plug 33 may prevent the tobacco rod 31 from escaping to the outside, and may also prevent an aerosol liquefied from the tobacco rod 31 during smoking from flowing into an aerosol generating device (e.g., the aerosol generating device 1 of FIGS. 1 to 3).

The filter rod 32 may include a first segment 321 and a second segment 322. Here, the first segment 321 may correspond to the first segment of the filter rod 22 of FIG. 4, and the second segment 322 may correspond to the third segment of the filter rod 22 of FIG. 4.

The diameter and the total length of the cigarette 3 may correspond to the diameter and the total length of the cigarette 2 of FIG. 4. For example, the length of the front end plug 33 may be about 7 mm, the length of the tobacco rod 31 may be about 15 mm, the length of the first segment 321 may be about 12 mm, and the length of the second segment 322 may be about 14 mm. However, embodiments are not limited thereto.

The cigarette 3 may be wrapped with at least one wrapper 35. The wrapper 35 may have at least one hole through which external air is introduced or internal gas flows out. For example, the front end plug 33 may be wrapped with a first wrapper 351, the tobacco rod 31 may be wrapped with a second wrapper 352, the first segment 321 may be wrapped with a third wrapper 353, and the second segment 322 may be wrapped with a fourth wrapper 354. In addition, the cigarette 3 may be entirely wrapped again with a fifth wrapper 355.

In addition, at least one perforation 36 may be formed in the fifth wrapper 355. For example, the perforation 36 may be formed in an area surrounding the tobacco rod 31. However, embodiments are not limited thereto. The perforation 36 may perform a function of transferring heat generated by the heater 13 shown in FIGS. 2 and 3 to the inside of the tobacco rod 31.

In addition, the second segment 322 may include at least one capsule 34. Here, the capsule 34 may perform a function of generating a flavor or a function of generating an aerosol. For example, the capsule 34 may have a structure in which a liquid containing a fragrance is wrapped with a film. The capsule 34 may have a spherical or cylindrical shape. However, embodiments are not limited thereto.

The first wrapper 351 may be a combination of general filter wrapping paper and a metal foil such as aluminum foil. For example, a total thickness of the first wrapper 351 may be in a range of 45 μm to 55 μm, and may be desirably about 50.3 μm. In addition, the thickness of the metal foil of the first wrapper 351 may be in a range of 6 μm to 7 μm, and may be desirably about 6.3 μm. In addition, the basis weight of the first wrapper 351 may be in a range of 50 g/m² to 55 g/m², and may be desirably about 53 g/m².

The second wrapper 352 and the third wrapper 353 may be formed with general filter wrapping paper. For example, the second wrapper 352 and the third wrapper 353 may be porous wrapping paper or non-porous wrapping paper.

For example, the porosity of the second wrapper 352 may be about 35000 CU. However, embodiments are not limited thereto. In addition, the thickness of the second wrapper 352 may be in a range of 70 μm to 80 μm, and may be desirably about 78 μm. In addition, the basis weight of the second wrapper 352 may be in a range of 20 g/m² to 25 g/m², and may be desirably about 23.5 g/m².

For example, the porosity of the third wrapper 353 may be about 24000 CU. However, embodiments are not limited thereto. In addition, the thickness of the third wrapper 353 may be in a range of 60 μm to 70 μm, and may be desirably about 68 μm. In addition, the basis weight of the third wrapper 353 may be in a range of 20 g/m² to 25 g/m², and may be desirably about 21 g/m².

The fourth wrapper 354 may be formed with polylactic acid (PLA) laminated paper. Here, the PLA laminated paper may refer to three-ply paper including a paper layer, a PLA layer, and a paper layer. For example, the thickness of the fourth wrapper 354 may be in a range of 100 μm to 120 μm, and may be desirably about 110 μm. In addition, the basis weight of the fourth wrapper 354 may be in a range of 80 g/m² to 100 g/m², and may be desirably about 88 g/m².

The fifth wrapper 355 may be formed of sterile paper (e.g., MFW). Here, the sterile paper (MFW) may refer to paper specially prepared such that it has enhanced tensile strength, water resistance, smoothness, or the like, compared to general paper. For example, the basis weight of the fifth wrapper 355 may be in a range of 57 g/m² to 63 g/m², and may be desirably about 60 g/m². In addition, the thickness of the fifth wrapper 355 may be in a range of 64 μm to 70 μm, and may be desirably about 67 μm.

The fifth wrapper 355 may have a predetermined material internally added thereto. The material may be, for example, silicon. However, embodiments are not limited thereto. Silicon may have properties, such as, for example, heat resistance which is characterized by less change by temperature, oxidation resistance which refers to resistance to oxidation, resistance to various chemicals, water repellency against water, or electrical insulation. However, silicon may not necessarily be used, and any material having such properties described above may be applied to (or used to coat) the fifth wrapper 355 without limitation.

The front end plug 33 may be formed of cellulose acetate. For example, the front end plug 33 may be manufactured by adding a plasticizer (e.g., triacetin) to cellulose acetate tow. A mono denier of a filament constituting the cellulose acetate tow may be in a range of 1.0 to 10.0, and may be desirably in a range of 4.0 to 6.0. The mono denier of the filament of the front end plug 33 may be more desirably 5.0. In addition, a cross section of the filament constituting the front end plug 33 may be Y-shaped. A total denier of the front end plug 33 may be in a range of 20000 to 30000, and may be desirably in a range of 25000 to 30000. The total denier of the front end plug 33 may be more desirably 28000.

In addition, as needed, the front end plug 33 may include at least one channel, and a cross-sectional shape of the channel may be provided in various ways.

The tobacco rod 31 may correspond to the tobacco rod 21 described above with reference to FIG. 4. Thus, a detailed description of the tobacco rod 31 will be omitted here.

The first segment 321 may be made of cellulose acetate. For example, the first segment may be a tubular structure including a hollow therein. The first segment 321 may be manufactured by adding a plasticizer (e.g., triacetin) to cellulose acetate tow. For example, the mono denier and the total denier of the first segment 321 may be the same as the mono denier and the total denier of the front end plug 33.

The second segment 322 may be made of cellulose acetate. The mono denier of a filament of the second segment 322 may be in a range of 1.0 to 10.0, and may be desirably in a range of 8.0 to 10.0. The mono denier of the filament of the second segment 322 may be more desirably about 9.0. In addition, a cross section of the filament of the second segment 322 may be Y-shaped. The total denier of the second segment 322 may be in a range of 20000 to 30000, and may be desirably about 25000.

FIG. 6 is a block diagram of an aerosol generating device 100 according to an embodiment.

The aerosol generating device 100 may include a biometric information obtainer 120, a heater 130, a controller 150, an output unit 160, a battery 170, a communication unit 180, a memory 192, and a user input unit 194. However, the internal structure of the aerosol generating device 100 is not limited to what is shown in FIG. 6. It is to be understood by one of ordinary skill in the art to which the disclosure pertains that some of the components shown in FIG. 6 may be omitted or new components may be added according to the design of the aerosol generating device 100.

The biometric information obtainer 120 may sense biometric information of a user accessing the aerosol generating device 100 and transmit the sensed biometric information to the controller 150. At this time, the controller 150 may control the aerosol generating device 100 to perform various functions such as controlling an operation (locking/unlocking) of the heater 196 and displaying notifications.

The biometric information obtainer 120 may include at least one of a fingerprint recognition sensor, an iris recognition sensor, a vein recognition sensor, a face recognition sensor, or a lip pattern recognition sensor.

The aerosol generating device 100 may further include at least one of a temperature sensor, an insertion detection sensor, a puff sensor, a humidity sensor, an atmospheric pressure sensor, a magnetic sensor, an acceleration sensor, a gyroscope sensor, a position sensor (e.g., a global positioning system (GPS)), a proximity sensor, or a red, green, blue (RGB) sensor (e.g., an illuminance sensor), in addition to the sensors described above. The temperature sensor 422 may sense a temperature at which the heater 130 (or an aerosol generating material) is heated. The aerosol generating device 100 may include a separate temperature sensor for sensing the temperature of the heater 130, or the heater 130 itself may perform a function as a temperature sensor. Alternatively, the temperature sensor may be arranged around the battery 170 to monitor the temperature of the battery 170. The insertion detection sensor may sense whether an aerosol generating article is inserted and/or removed. The insertion detection sensor may include, for example, at least one of a film sensor, a pressure sensor, a light sensor, a resistive sensor, a capacitive sensor, an inductive sensor, or an infrared sensor, which may sense a signal change by the insertion and/or removal of the aerosol generating article. The puff sensor may sense a puff from a user based on various physical changes in an airflow path or airflow channel. For example, the puff sensor may sense the puff from the user based on any one of a temperature change, a flow change, a voltage change, and a pressure change. In addition, a function of each sensor may be intuitively inferable from its name by one of ordinary skill in the art, and thus, a more detailed description thereof will be omitted here.

The output unit 160 may output information about the state of the aerosol generating device 100 and provide the information to the user. The output unit 160 may include at least one of the display 162, a haptic portion 164, or a sound outputter 166. However, embodiments are not limited thereto. When the display 162 and a touchpad are provided in a layered structure to form a touchscreen, the display 162 may be used as an input device in addition to an output device.

The display 162 may visually provide information on the aerosol generating device 100 to the user in addition to the information on inhalation of the functional material. The information about the aerosol generating device 100 may include, for example, a charging/discharging state of the battery 170 of the aerosol generating device 100, a preheating state of the heater 130, an insertion/removal state of the aerosol generating article, a limited usage state (e.g., an abnormal article detected) of the aerosol generating device 100, or the like, and the display 162 may externally output the information. The display 162 may be, for example, a liquid-crystal display panel (LCD), an organic light-emitting display panel (OLED), or the like. The display 162 may also be in a form of a light-emitting diode (LED) device.

The haptic portion 164 may provide information about the aerosol generating device 100 to the user in a haptic way by converting an electrical signal into a mechanical stimulus or an electrical stimulus. The haptic portion 134 may include, for example, a motor, a piezoelectric element, or an electrical stimulation device.

The sound outputter 166 may audibly provide the information on the aerosol generating device 100 to the user together with the information on inhalation of the functional material. For example, the sound outputter 166 may convert an electrical signal into a sound signal and externally output the sound signal.

The battery 170 may supply power to be used to operate the aerosol generating device 100. The battery 170 may supply power to heat the heater 130. In addition, the battery 170 may supply power required for operations of the other components (e.g., the biometric information obtainer 120, the output unit 160, the memory 192, the user input unit 194, and the communication unit 180) included in the aerosol generating device 100. The battery 170 may be a rechargeable battery or a disposable battery. The battery 170 may be, for example, a lithium polymer (LiPoly) battery. However, embodiments are not limited thereto.

The heater 130 may receive power from the battery 170 to heat the functional material. Although not shown in FIG. 6, the aerosol generating device 100 may further include a power conversion circuit (e.g., a direct current (DC)-to-DC (DC/DC) converter) that converts power of the battery 170 and supplies the power to the heater 130. In addition, when the aerosol generating device 100 generates an aerosol in an induction heating manner, the aerosol generating device 100 may further include a DC-to-alternating current (AC) (DC/AC) converter that converts DC power of the battery 170 into AC power.

The biometric information obtainer 120, the controller 150, the output unit 160, the communication unit 180, the user input unit 194, and the memory 192 may receive power from the battery 170 to perform functions. Although not shown in FIG. 6, the aerosol generating device 100 may further include a power conversion circuit, for example, a low dropout (LDO) circuit or a voltage regulator circuit, which converts power of the battery 170 and supplies the power to respective components.

In an embodiment, the heater 130 may be formed of a predetermined electrically resistive material that is suitable for generating heat. For example, the electrically resistive material may be a metal or a metal alloy including, for example, titanium, zirconium, tantalum, platinum, nickel, cobalt, chromium, hafnium, niobium, molybdenum, tungsten, tin, gallium, manganese, iron, copper, stainless steel, nichrome, or the like. However, embodiments are not limited thereto. In addition, the heater 130 may be implemented as a metal heating wire, a metal heating plate on which an electrically conductive track is arranged, a ceramic heating element, or the like. However, embodiments are not limited thereto. In another embodiment, the heater 130 may be excluded from the aerosol generating device 100.

In another embodiment, the heater 130 may be an induction heater. For example, the heater 130 may include a susceptor that heats the aerosol generating material by generating heat through a magnetic field applied by a coil.

In an embodiment, the heater 130 may include a plurality of heaters. For example, the heater 130 may include a first heater for heating a cigarette and a second heater for heating a liquid.

The user input unit 194 may receive information input from the user or may output information to the user. For example, the user input unit 194 may include a keypad, a dome switch, a touchpad (e.g., a contact capacitive type, a pressure resistive film type, an infrared sensing type, a surface ultrasonic conduction type, an integral tension measurement type, a piezo effect method, etc.), a jog wheel, a jog switch, or the like. However, embodiments are not limited thereto. In addition, although not shown in FIG. 6, the aerosol generating device 100 may further include a connection interface such as a universal serial bus (USB) interface, and may be connected to another external device through the connection interface such as a USB interface to transmit and receive information or to charge the battery 170.

The memory 192, which is hardware for storing various pieces of data processed in the aerosol generating device 100, may store data processed by the controller 150 and data to be processed thereby. The memory 192 may include at least one type of storage medium of a flash memory type memory, a hard disk type memory, a multimedia card micro type memory, a card type memory (e.g., an SD or XE memory), a random access memory (RAM), a static random access memory (SRAM), a read-only memory (ROM), an electrically erasable programmable read-only memory (EE-PROM), a programmable read-only memory (PROM), a magnetic memory, a magnetic disk, or an optical disk. The memory 192 may store an operating time of the aerosol generating device 100, a maximum number of puffs, a current number of puffs, at least one temperature profile, data associated with a smoking pattern of the user, or the like.

The communication unit 180 may include at least one component for communicating with another electronic device (e.g., a user terminal). For example, the communication unit 180 may include a short-range wireless communication unit 182 and a wireless communication unit 184.

The short-range wireless communication unit 182 may include a Bluetooth communication unit, a BLE communication unit, a near field communication unit, a WLAN (Wi-Fi) communication unit, a ZigBee communication unit, an infrared data association (IrDA) communication unit, a Wi-Fi direct (WFD) communication unit, an ultra-wideband (UWB) communication unit, and an Ant+ communication unit. However, embodiments are not limited thereto.

The wireless communication unit 184 may include, for example, a cellular network communicator, an Internet communicator, a computer network (e.g., a local area network (LAN) or a wide-area network (WAN)) communicator, or the like. However, embodiments are not limited thereto. The wireless communication unit 184 may use subscriber information (e.g., international mobile subscriber identity (IMSI)) to identify and authenticate the aerosol generating device 100 in a communication network.

The controller 150 may control the overall operation of the aerosol generating device 100. In an embodiment, the controller 150 may include at least one processor. The at least one processor may be implemented as an array of a plurality of logic gates, or may be implemented as a combination of a general-purpose microprocessor and a memory in which a program executable by the microprocessor is stored. In addition, it is to be understood by one of ordinary skill in the art to which the disclosure pertains that it may be implemented in other types of hardware.

The controller 150 may control the temperature of the heater 130 by controlling the supply of power from the battery 170 to the heater 130. For example, the controller 150 may control the supply of power by controlling switching of a switch element between the battery 170 and the heater 130. In another example, a direct heating circuit may control the supply of power to the heater 130 according to a control command from the controller 150.

The controller 150 may analyze a sensing result obtained by the sensing of a sensing unit (sensors) and control processes to be performed thereafter. For example, the controller 150 may control power to be supplied to the heater 130 to start or end an operation of the heater 130 based on the sensing result obtained by the sensing unit. As another example, the controller 150 may control an amount of power to be supplied to the heater 130 and a time for which the power is to be supplied, such that the heater 130 may be heated up to a predetermined temperature or maintained at a desired temperature, based on the sensing result of the sensing unit.

The controller 150 may control the output unit 160 based on the sensing result obtained by the sensing unit. For example, when the number of puffs counted through the puff sensor reaches a preset number, the controller 150 may inform the user that the aerosol generating device 100 is to be ended soon, through at least one of the display 162, the haptic portion 164, or the sound outputter 166.

In an embodiment, the controller 150 may control a power supply time and/or a power supply amount for the heater 130 according to a state of the aerosol generating article sensed by the sensing unit. For example, when the aerosol generating article is in an over-humidified state, the controller 150 may control the power supply time for an inductive coil to increase a preheating time, compared to a case where the aerosol generating article is in a general state.

FIGS. 7 and 8 schematically illustrate the aerosol generating device 100 according to an embodiment.

Referring to FIG. 7, the aerosol generating device 100 may include a housing 110, the biometric information obtainer 120 at least a part of which is exposed to the outside of the housing 110 to obtain biometric information of a user, an aerosol generator disposed in the housing 110 to activate aerosol generation, the controller 150 configured to control the biometric information obtainer 120 or the aerosol generator, and the battery 170 configured to supply power to the aerosol generator or the controller 150. The controller 150 may determine activation of the aerosol generator based on the biometric information of the user.

In an example, the aerosol generator may include the heater 130, which may be heated by the power supplied from the battery 170. For example, when a cigarette is inserted in the aerosol generating device 100, the heater 130 may be disposed outside the cigarette. The heated heater 130 may thus raise the temperature of an aerosol generating material in the cigarette. In addition, the heater 130 may be provided as a plurality of heaters in the aerosol generating device 100.

In this case, the plurality of heaters 130 may be disposed to be inserted into the cigarette, or may be disposed outside the cigarette.

In another example, the aerosol generator may include a vaporizer. The vaporizer may generate an aerosol by heating a liquid composition, and the generated aerosol may pass through the cigarette and be delivered to the user. Alternatively, a liquid composition containing nicotine may be aerosolized and delivered directly to the user without passing through the cigarette. To this end, the vaporizer may include a liquid storage, a liquid transfer means, and a heating element. The liquid storage may store a liquid composition. The liquid composition may be, for example, a liquid including a tobacco-containing material that includes a volatile tobacco flavor component, or may be a liquid including a non-tobacco material. The liquid transfer means may transfer the liquid composition in the liquid storage to the heating element. The liquid transfer means may be, for example, a wick such as cotton fiber, ceramic fiber, glass fiber, or porous ceramic. However, embodiments are not limited thereto. The heating element may be an element for heating the liquid composition transferred by the liquid transfer means. The heating element may be, for example, a metal heating wire, a metal heating plate, a ceramic heater, or the like. However, embodiments are not limited thereto. In addition, the heating element may include a conductive filament such as a nichrome wire, and may be arranged in a structure wound around the liquid transfer means. The heating element may be heated as a current is supplied and may transfer heat to the liquid composition in contact with the heating element, and may thereby heat the liquid composition. As a result, an aerosol may be generated. For example, the vaporizer may also be referred to as a cartomizer or an atomizer. However, embodiments are not limited thereto.

The biometric information obtainer 120 may include at least one of a fingerprint recognition sensor, an iris recognition sensor, or a vein recognition sensor. Alternatively, when a cartridge accommodated in the aerosol generating device 100 is provided, a sensor (e.g., a lip pattern recognition sensor) configured to recognize biometric information may also be mounted on the cartridge.

In an embodiment, the aerosol generating device 100 may be in a shipping mode immediately after the user purchases the aerosol generating device 100. In the shipping mode, the aerosol generating device 100 may be in an inactive state in which power from the battery 170 is not provided to the other components (e.g., the heater 130 and the controller 150). The user may switch from the shipping mode to a normal mode. At this time, the user may store biometric information of the user in the aerosol generating device 100 through the biometric information obtainer 120 according to a user manual or a guide on a display (e.g., the display 162 of FIG. 6). Accordingly, biometric information data of a genuine user may be stored in a memory (e.g., the memory 192 of FIG. 6) of the aerosol generating device 100. Here, the genuine user may be defined as a registered user who is allowed to use the aerosol generating device 100.

Thereafter, a user who wants to use the aerosol generating device 100 may activate an aerosol generator (unlock the aerosol generating device 100) through genuine user authentication through the biometric information obtainer 120. For example, when the biometric information obtainer 120 includes a fingerprint recognition sensor, a fingerprint of the user may be obtained through the fingerprint recognition sensor, and the controller 150 may compare the obtained fingerprint information of the user and the registered biometric information (e.g., fingerprint information) of the genuine user. The controller 150 may unlock the aerosol generating device 100 if the obtained fingerprint information matches the registered biometric information, and maintain the aerosol generating device 100 to be locked if the obtained fingerprint information does not match the registered biometric information.

Referring to FIG. 8, the aerosol generating device 100 may further include the communication unit 180. For example, the communication unit 180 may include a short-range wireless communication unit (e.g., the short-range wireless communication unit 182 of FIG. 6) enabling communication with a user terminal 200 (e.g., a mobile communication terminal), and the controller 150 may unlock the aerosol generating device 100 through an authentication procedure of at least two phases based on information from the user terminal 200.

In an embodiment, the controller 150 may perform a primary authentication phase of determining whether the user is the genuine user by the user terminal 200 and a secondary authentication phase of determining whether the user is the genuine user through the biometric information of the user. At this time, in the primary authentication phase, the user may be authenticated as an adult through an authorized adult authentication application on the user terminal 200. For example, after the user initially purchases the aerosol generating device 100, the user may install the authorized adult authentication application on the user terminal 200 according to a guide in a manual. The communication unit 180 may transmit program information readable by a near field communication (NFC) sensor of the user terminal 200, and the program information may be data of a target program (i.e., the authorized adult authentication application) to be stored (or installed) in the user terminal 200. As another example, the program information may be a target uniform resource locator (URL) address at which data of the target program is stored. In a state in which the connection between the aerosol generating device 100 and the user terminal 200 is built through the communication unit 180, a result of the adult authentication completed on the user terminal 200 may be transmitted to the aerosol generating device 100. Next, the controller 150 may determine only a user who has passed adult authentication is a genuine user, and perform a secondary authentication phase of the two-phase authentication through biometric information authentication.

In another embodiment, in the primary authentication phase, the user may authenticate himself/herself through fingerprint, iris, or face recognition on the user terminal 200, and a result of completing the genuine user authentication by the user terminal 200 may be transmitted to the controller 150 through the communication unit 180. Next, the controller 150 may perform a secondary authentication phase of comparing the biometric information of the user obtained from the biometric information obtainer 120 and prestored biometric information data of a genuine user. Based on the result of the secondary authentication phase, the controller 150 may determine whether to unlock the aerosol generating device 100.

In another embodiment, the controller 150 may perform a primary authentication phase based on location information of the user terminal 200 and a secondary authentication phase through the biometric information. For example, the controller 150 may perform the primary authentication phase of determining whether the user is in a smoking area based on the location information of the user terminal 200. For example, in a state in which the connection between the aerosol generating device 100 and the user terminal 200 is built through the communication unit 180, the controller 150 may maintain a locking state when a current location of the user verified by a GPS sensor of the user terminal 200 is determined to be a non-smoking area (e.g., indoors, or a non-smoking area within a predetermined radius from a school/kindergarten/daycare center).

In addition, the controller 150 may provide information on smoking areas around the user based on location information of the user terminal 200. In an example, the controller 150 may display guide information about the smoking areas (e.g., smoking booths) on a display (e.g., the display 162 of FIG. 5) or the user terminal 200 based on GPS information and surrounding map information with respect to the user terminal 200.

Hereinafter, an unlocking method through two-phase authentication interoperating with the user terminal 200 will be described in detail with reference to FIGS. 9 to 11.

Referring to FIG. 9, genuine user authentication through user authentication by a user terminal and a comparison of biometric information may be performed to unlock the aerosol generating device 100.

In operation S11, biometric information data of a genuine user may be registered in the aerosol generating device 100. For example, the genuine user may register his/her own biometric information (e.g., fingerprint, iris, vein, face, or lip pattern information) in the aerosol generating device 100 through a biometric information obtainer (e.g., the biometric information obtainer 120 of FIG. 8).

In an embodiment, the registration procedure may be performed after adult authentication is performed. In particular, referring to FIG. 10, in operation S111, whether the genuine user is an adult may be verified through an adult authentication application on the user terminal 200. In operation S112, a result of adult authentication performed by the user terminal 200 may be transmitted to the aerosol generating device 100 through the communication unit 180. In operation S113, biometric information data of the genuine user obtained by the biometric information obtainer 120 may be registered only when the genuine user is verified as an adult. The registered biometric information of the genuine user may be stored in a memory (e.g., the memory 192 of FIG. 8) of the aerosol generating device 100.

For example, after the user initially purchases the aerosol generating device 100, the user may install the authorized adult authentication application on the user terminal 200 according to a guide in a manual. A communication unit (e.g., the communication unit 180 of FIG. 8) may transmit program information readable by a near field communication (NFC) sensor of the user terminal 200, such that the authorized adult authentication application may be installed in the user terminal 200. The program information may be data of the adult authentication application to be stored (or installed) in the user terminal 200. As another example, the program information may be a target URL address at which data on the adult authentication application is stored. A result of adult authentication performed on the user terminal 200 may be transmitted to the aerosol generating device 100, and a controller (e.g., the controller 150 of FIG. 8) may register the biometric information data of the genuine user in the aerosol generating device 100 only when the user is authenticated as an adult.

Referring back to FIG. 9, in operation S12, biometric information of a user who desires to use the aerosol generating device 100 may be obtained through the biometric information obtainer 120.

Next, as a primary authentication phase, in operation S13, a user authentication procedure of authenticating that a current user is a genuine user may be performed by the user terminal 200. For example, the user terminal 200 may perform genuine user authentication for the user based on a program configured to authenticate a genuine user of the aerosol generating device 100.

If genuine user authentication is completed on the user terminal 200, a controller (e.g., the controller 150 of FIG. 8) may perform a secondary authentication phase. If not, the controller 150 may maintain a locking state.

As the secondary authentication phase, in operation S14, the controller 150 may identify whether the user is authenticated as the genuine user by comparing the biometric information of the user obtained in operation S12 and the registered biometric information of the genuine user. If the biometric information of the user and the registered biometric information of the genuine user do not match, the controller 150 may not activate an aerosol generator so as to maintain the locking state. If the biometric information obtained in operation S12 matches the registered biometric information, the aerosol generating device 100 may be unlocked, in operation S15.

It is described above that operation S13 of performing user authentication by the user terminal 200 is performed after operation S12 of obtaining the biometric information of the user from the biometric information obtainer 120. However, embodiments are not limited thereto. For example, operation S12 may be performed after operation S13. Also, operation S13 may be performed after operation S14.

Referring to FIG. 11, the controller 150 may perform genuine user authentication through primary authentication based on location information of the user terminal and secondary authentication through a comparison of biometric information.

In operation S21, biometric information data of a genuine user may be registered in the aerosol generating device 100. In operation S22, biometric information of a user may be obtained from the biometric information obtainer 120.

At this time, operation S21 may be performed after adult authentication is performed. Since this has been described above with reference to FIG. 10, a detailed description thereof will be omitted for simplicity.

Then, primary authentication of determining whether to activate the aerosol generating device 100 may be performed based on location information of the user terminal 200, in operation S23. For example, when the location of the user detected by the GPS sensor of the user terminal 200 corresponds to indoors or a non-smoking area close to a children's or youth facility (e.g., a daycare center/kindergarten/school), the controller 150 may maintain the locking state. If not, the controller 150 may perform secondary authentication in operation S24.

In addition, when the user is within a predetermined radius from a smoking booth based on GPS location information and map information of the user terminal 200, the controller 150 may perform a smoking area notification function to show the location of a nearby smoking area.

If the primary authentication is successful based on the location information of the user terminal 200, the controller 150 may perform genuine user authentication by comparing the obtained biometric information of the user with the registered biometric information of the genuine user, in operation S24. Only when the user is authenticated as the genuine user through the secondary authentication, the controller 150 may unlock the aerosol generating device 100, in operation S25.

According to embodiments, the aerosol generating device 100 may be unlocked only by a registered genuine user, and device misuse may be reliably prevented through the two-phase authentication procedure. In addition, more reliable device use may be expected by activating the device based on the current location of a user, adult verification of the user, and/or additional user authentication in addition to biometric information of the user.

The descriptions of the above-described embodiments are merely examples, and it will be understood by one of ordinary skill in the art that various changes and equivalents may be made thereto. Therefore, the scope of the disclosure should be defined by the appended claims, and all differences within the scope equivalent to those described in the claims will be construed as being included in the scope of protection defined by the claims.

The features and aspects of any embodiment(s) described above may be combined with features and aspects of any other embodiment(s) without resulting in apparent technical conflicts.

The invention claimed is:

1. An aerosol generating device with a locking function, the aerosol generating device comprising:
   a housing;
   a battery disposed in the housing and configured to supply power;
   an aerosol generator configured to receive the power from the battery and activate aerosol generation;
   a biometric information obtainer exposed to an outside of the housing and configured to obtain biometric information of a user; and
   a controller configured to perform authentication of the user based on the biometric information and activate the aerosol generator based on a result of the authentication through an authentication procedure of at least two phases,
   wherein the controller is configured to perform a primary authentication phase of determining whether the user is a genuine user by a user terminal and a secondary authentication phase of determining whether the user is the genuine user through the biometric information, and
   wherein, whether the genuine user is an adult is verified through an adult authentication application on the user terminal and a result of an adult authentication performed by the user terminal is transmitted to the aerosol generating device, and biometric information data of the genuine user is registered in the aerosol generating device by the biometric information obtainer, when the genuine user is verified to be the adult.

2. The aerosol generating device of claim 1, further comprising:
   a communication unit configured to enable a communication with the user terminal.

3. The aerosol generating device of claim 2, wherein in the primary authentication phase, adult verification of the user is performed through an authorized adult authentication application on the user terminal.

4. The aerosol generating device of claim 2, wherein in the primary authentication phase, user authentication is performed based on the biometric information of the user obtained by the user terminal.

5. The aerosol generating device of claim 1, further comprising:
   a communication unit configured to enable interoperation between the controller and the user terminal, wherein the controller is configured to perform the primary authentication phase of determining whether the aerosol generator is activatable based on location information of the user terminal and the secondary authentication phase of determining whether the user is the genuine user through the biometric information.

6. The aerosol generating device of claim 5, wherein the controller is configured to perform the primary authentication phase by determining whether the user is in a smoking area based on the location information of the user terminal.

7. The aerosol generating device of claim 6, wherein the controller is configured to provide information on smoking areas around the user based on the location information of the user terminal.

8. The aerosol generating device of claim 1, wherein the biometric information obtainer comprises at least one of a fingerprint recognition sensor, an iris recognition sensor, a vein recognition sensor, or a lip pattern recognition sensor.

9. A method of unlocking an aerosol generating device, the method comprising:

registering biometric information data of a genuine user in the aerosol generating device;

obtaining biometric information of a user through a biometric information obtainer provided in the aerosol generating device;

determining whether the user is the genuine user based on the obtained biometric information; and unlocking the aerosol generating device when the user is determined to be the genuine user, wherein the registering of the biometric information data of the genuine user in the aerosol generating device comprises:

verifying whether the genuine user is an adult through an adult verification application on a user terminal;

transmitting a result of the verifying to the aerosol generating device; and registering the biometric information data of the genuine user in the aerosol generating device obtained by the biometric information obtainer, when the genuine user is verified to be the adult.

10. The method of claim 9, wherein the determining comprises:

a primary authentication phase of determining whether the user is the genuine user by the user terminal; and a secondary authentication phase of determining whether the user is the genuine user through a comparison between the obtained biometric information and the registered biometric information.

11. The method of claim 9, wherein the determining comprises:

a primary authentication phase of determining whether the aerosol generating device is activatable based on location information of the user terminal; and a secondary authentication phase of determining whether the user is the genuine user through a comparison between the obtained biometric information and the registered biometric information.

12. The method of claim 9, wherein the biometric information comprises at least one of a fingerprint, an iris, a vein, or a lip pattern of the user.

* * * * *